(12) United States Patent
Sung et al.

(10) Patent No.: US 11,851,019 B2
(45) Date of Patent: Dec. 26, 2023

(54) VEHICLE SEAT AIRBAG APPARATUS

(71) Applicants: Hyundai Motor Company, Seoul (KR); Kia Corporation, Seoul (KR); Hyundai Mobis Co., Ltd., Seoul (KR)

(72) Inventors: Il Chang Sung, Gyeonggi-do (KR); Sang Won Hwangbo, Gyeongg-do (KR)

(73) Assignees: Hyundai Motor Company, Seoul (KR); Kia Corporation, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/876,097

(22) Filed: Jul. 28, 2022

(65) Prior Publication Data

US 2023/0166682 A1    Jun. 1, 2023

(30) Foreign Application Priority Data

Nov. 26, 2021 (KR) .................. 10-2021-0165865

(51) Int. Cl.
*B60R 21/207* (2006.01)
*B60R 21/233* (2006.01)
*B60R 21/2338* (2011.01)
*B60R 21/0136* (2006.01)

(52) U.S. Cl.
CPC ........ *B60R 21/207* (2013.01); *B60R 21/0136* (2013.01); *B60R 21/233* (2013.01); *B60R 21/2338* (2013.01); *B60R 2021/23324* (2013.01); *B60R 2021/23384* (2013.01)

(58) Field of Classification Search
CPC . B60R 21/207; B60R 21/0136; B60R 21/233; B60R 21/2338; B60R 2021/23324; B60R 2021/23384
See application file for complete search history.

(56) References Cited

U.S. PATENT DOCUMENTS

| 6,513,835 | B2 * | 2/2003 | Thomas ................ B60R 21/216 280/736 |
| 7,651,130 | B2 * | 1/2010 | Bauberger ............ B60R 21/239 280/743.2 |
| 7,661,708 | B2 * | 2/2010 | Szidzek ................ B60R 21/213 280/743.1 |
| 11,110,883 | B1 * | 9/2021 | Deng .................... B60R 21/264 |
| 2010/0090445 | A1 * | 4/2010 | Williams ............ B60R 21/2338 280/743.2 |

(Continued)

FOREIGN PATENT DOCUMENTS

| JP | 2010083175 | A | * | 4/2010 | ....... B60R 21/01546 |
| JP | 2017109623 | A | * | 6/2017 | ........... B60R 21/207 |

(Continued)

*Primary Examiner* — Drew J Brown
(74) *Attorney, Agent, or Firm* — Fox Rothschild LLP

(57) ABSTRACT

Embodiments of the present disclosure relate to a vehicle seat airbag apparatus, wherein: when a side collision accident occurs, an active vent hole is closed to delay the deployment speed of a front cushion and thus to enable a side cushion so as to have sufficient internal pressure, thereby improving ability to respond to a side collision; and when a frontal collision accident occurs, the active vent hole maintains an open state to rapidly deploy the front cushion, thereby improving ability to respond to a frontal collision.

16 Claims, 8 Drawing Sheets

(56) References Cited

U.S. PATENT DOCUMENTS

| | | | |
|---|---|---|---|
| 2011/0316264 A1* | 12/2011 | Maruyama | B60R 21/2171 |
| | | | 280/730.2 |
| 2019/0061671 A1* | 2/2019 | Jang | B60R 21/233 |
| 2021/0094499 A1* | 4/2021 | Deng | B60R 21/261 |
| 2021/0122318 A1* | 4/2021 | Yoo | B60R 21/23138 |

FOREIGN PATENT DOCUMENTS

| | | | | |
|---|---|---|---|---|
| KR | 10-2019-0020254 A | | 2/2019 | |
| KR | 20190020254 A | * | 2/2019 | |
| WO | WO-2019138954 A1 | * | 7/2019 | B60N 2/427 |

* cited by examiner

VEHICLE SEAT AIRBAG APPARATUS

CROSS-REFERENCE TO RELATED APPLICATIONS

This application is based on and claims under 35 U.S.C. 119 the benefit of Korean Patent Application No. 10-2021-0165865, filed on Nov. 26, 2021, in the Korean Intellectual Property Office, the disclosure of which is herein incorporated by reference in its entirety.

TECHNICAL FIELD

The present disclosure relates to a vehicle seat airbag apparatus and, more specifically, to a technology regarding a vehicle seat airbag apparatus including a side cushion deployed from a seatback and a front cushion extending from the side cushion such that the speed of airbag gas supplied towards the front cushion can be adjusted according to whether a side collision or a frontal collision occurs.

BACKGROUND

There has recently been rapid development of autonomous vehicles which are smart vehicles combined with autonomous driving technology such that the same can autonomously reach the destination without manual operations of the handle, acceleration pedal, brake, and the like by the driver.

If an autonomous driving situation is universally implemented, the driver may select, while driving a car, a relax mode in which the driver does not manually drive the car and can rest, and seat movement, rotation, posture, and the like can be variously changed at the passenger's request in the relax mode situation.

If the passenger's seating condition is variously changed in the autonomous driving situation described above, it is impossible to effectively restrain the passenger's behavior during an accident solely by a conventional vehicle airbag apparatus.

Therefore, there is a need for an airbag apparatus based on a new concept appropriate for an autonomous vehicle. For example, there has been development of a seat airbag apparatus wherein a side cushion configured to be deployed forwards from a seatback and a front cushion configured to be deployed from the side cushion to the front of a passenger are used to effectively restrain the passenger's behaviors all in lateral, forward, and diagonal directions, thereby further enhancing passenger protection.

Such a seat airbag apparatus having side and front cushions is configured such that the side cushion is first deployed by airbag gas generated by operation of an inflator, and the front cushion is then deployed upon receiving airbag gas from the side cushion.

However, the conventional seat airbag apparatus has shortcomings in that, even if a side collision has occurred, airbag gas quickly moves to the front cushion through the side cushion, making it difficult to maintain the internal pressure of the side cushion, and this degrades side collision performance.

The above descriptions regarding background technologies have been made only to help understanding of the background of the present disclosure, and are not to be deemed by those skilled in the art to correspond to already-known prior arts.

SUMMARY

It is an exemplary embodiment of the present disclosure to provide a vehicle seat airbag apparatus including a side cushion deployed forwards from a seatback, a front cushion extending from the side cushion to the front of a passenger, and a diaphragm having an active vent structure installed between the side cushion and the front cushion such that, during a frontal collision, the active vent structure is opened to increase the speed of deployment of the front cushion, thereby improving frontal collision performance, and during a side collision, the active vent structure is closed so as to decrease the speed of deployment of the front cushion, thereby improving side collision performance by maintaining sufficient inner pressure of the side cushion, and further enhancing passenger protection performance accordingly.

In accordance with an exemplary embodiment of the present disclosure, a vehicle seat airbag apparatus may include: a side cushion configured to protrude and deploy forward from a seatback and positioned at each of the side surfaces of a passenger; a front cushion configured to protrude and deploy from the side cushion to the front of the passenger; a diaphragm which is installed at a portion to which the side cushion and the front cushion are connected so as to separate a side chamber and a front chamber, and includes a basic vent hole configured to always connect the side chamber and the front chamber and an active vent hole configured to connect or disconnect the side chamber and the front chamber; and an active vent hole operating device provided to be connected to the active vent hole and configured to open or close the active vent hole depending on a collision situation.

In some embodiments, the diaphragm may be made of a fabric material and sewn and coupled to the portion to which the side cushion and the front cushion are connected.

In some embodiments, a cylindrical member may be coupled to protrude from the diaphragm toward the front chamber; and the active vent hole may be configured such that, as the cylindrical member is opened or closed, the side chamber and the front chamber are connected to or disconnected from each other.

In some embodiments, the cylindrical member may be made of a fabric material, and one end thereof is sewn and coupled to the diaphragm.

In some embodiments, the active vent hole operating device may include: an actuator fixed to a seatback frame and operated by an airbag control unit; an actuating part inserted into the actuator or broken when the actuator operates; and a tether having one end coupled to the cylindrical member and the other end connected to the actuating part after being wound along the circumference of the cylindrical member, the other end being separated from the actuating part only when the actuating part operates.

In some embodiments, a slit hole penetrating the inner and the outer side of the cylindrical member may be formed through the cylindrical member; the one end of the tether may be sewn and coupled to one side of the slit hole; and the other end of the tether may be installed to be connected to the actuating part after surrounding the circumference of the cylindrical member in a circular shape and then passing through the slit hole.

In some embodiments, when a frontal collision accident occurs, the actuator may be configured to operate by control of the airbag control unit, and when a side collision accident occurs, the actuator is configured not to operate by control of the airbag control unit.

In some embodiments, the vehicle seat airbag apparatus may further include an inflator configured to operate by control of the airbag control unit which has received signals from a front collision sensor and a side collision sensor installed in the vehicle so as to generate airbag gas.

In some embodiments, in a folded state where both the side cushion and the front cushion are undeployed as the inflator does not operate, the tether may be configured to maintain a state where both ends thereof are connected to the cylindrical member and the actuating part, and the active vent hole may be configured to maintain an open state.

In some embodiments, when a frontal collision accident occurs, the inflator and the actuator may be configured to operate together by control of the airbag control unit, and when the actuating part operates by an operation of the actuator, the active vent hole may be configured to maintain an open state as the tether is separated from the actuating part, and the airbag gas generated by the inflator may be supplied from the side chamber to the front chamber through the basic vent hole and the active vent hole.

In some embodiments, when a side collision accident occurs, by control of the airbag control unit, the inflator may operate and the actuator may not operate, and the side cushion may be deployed by the airbag gas generated by the inflator, and when the side cushion is deployed, the tether may be pulled toward the actuating part, and the cylindrical member may be tethered by the tether by the pulling of the tether so that the active vent hole is closed and the airbag gas is supplied from the side chamber to the front chamber only through the basic vent hole.

In some embodiments, the inflator may be fixed to an inflator bracket; the actuator may be fixed to an actuator bracket; the inflator bracket and the actuator bracket may be connected to each other; and the inflator bracket may be coupled to the seatback frame to allow same to be fixed thereto.

In some embodiments, the actuator may be covered by an actuator cover.

In some embodiments, the actuator is fixed to the seatback frame by multiple studs.

In some embodiments, the basic vent hole may be configured to have a size larger than the active vent hole so as to increase the deployment speed of the front cushion, thereby improving ability to respond to a frontal collision; and the active vent hole may be configured to have a size larger than the basic vent hole so as to allow the side cushion to maintain an increased internal pressure through a delay of the deployment speed of the front cushion, thereby improving ability to respond to a side collision.

In some embodiments, a protection area, in which the passenger is protected by the side cushion, may include the head, the chest, the abdomen, and the pelvis area of the passenger; when the active vent hole is positioned higher than the basic vent hole, a function for protection of the head of the passenger by the side cushion may be enhanced; and when the active vent hole is positioned lower than the basic vent hole, a function for protection of the pelvis of the passenger by the side cushion may be enhanced.

In some embodiments, a vehicle seat airbag apparatus according to the present disclosure includes a side cushion deployed forwards from a seatback, a front cushion extending from the side cushion to the front of a passenger, and a diaphragm having an active vent structure installed between the side cushion and the front cushion. During a side collision accident, an active vent hole is closed by an active vent hole operating device so as to decrease the speed of deployment of the front cushion, thereby improving side collision performance by maintaining sufficient inner pressure of the side cushion. During a frontal collision accident, the active vent hole remains open so as to increase the speed of supply of airbag gas to the front cushion, thereby improving frontal collision performance by quickly deploying the front cushion. This is advantageous in that passenger protection performance is further enhanced.

As discussed, the system suitably includes use of a controller or processor.

In another embodiment, vehicles are provided that comprise an apparatus as disclosed herein.

In a fully autonomous vehicle or system, the vehicle may perform all driving tasks under all conditions and little or no driving assistance is required from a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems or vehicles may be fully autonomous. In other certain embodiments, the present systems and vehicles may be semi-autonomous.

DETAILED DESCRIPTION

Figure 1:
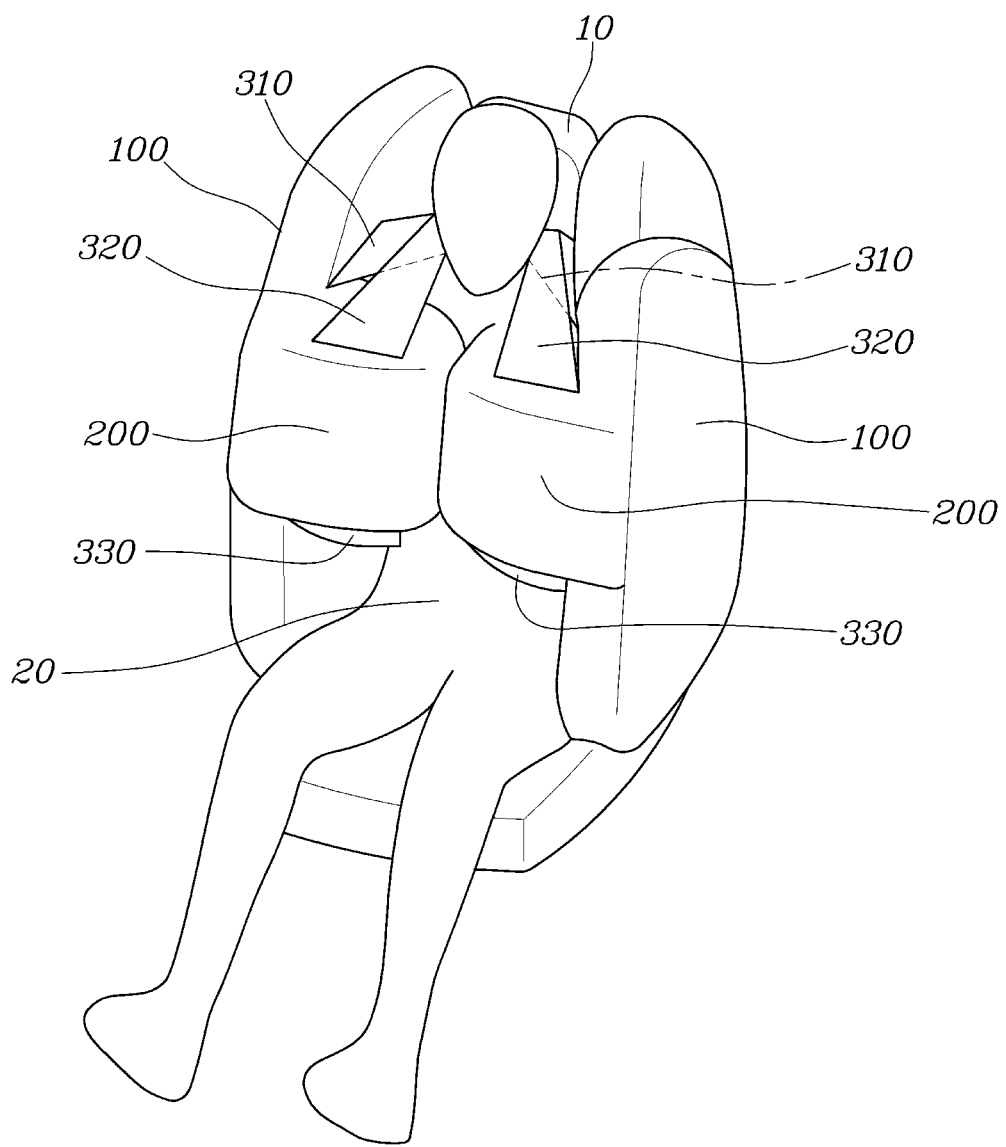
FIG. 1 is a perspective view of a state in which a vehicle seat airbag apparatus according to the present disclosure is deployed.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" to and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

A control unit (controller) according to exemplary embodiments of the present disclosure may be implemented by a non-volatile memory (not shown) which is configured to store data pertaining to an algorithm configured to control operations of various vehicle components or software instructions for reproducing the algorithm, and a processor (not shown) which is configured to perform the operations as described below by using the data stored in the corresponding memory. Here, the memory and the processor may be implemented as individual chips. Alternatively, the memory and the processor may be implemented as an integrated single chip. The processor may be in the form of one or more processors.

Hereinafter, a vehicle seat airbag apparatus according to a preferable embodiment of the present disclosure will be described with reference to the accompanying FIG. 1 to FIG. 8.

A vehicle seat airbag apparatus according to the present disclosure may include: side cushions 100 configured to protrude and deploy forward from a seatback 10 constituting a vehicle seat, and to cover the side surfaces of a passenger 20 seated on a seat so as to protect same after being deployed; and front cushions 200 configured to protrude and deploy from the side cushions 100 to the front of the passenger 20, and to cover the front of the passenger 20 so as to protect same after being deployed.

The side cushions 100, and the front cushions 200 may be configured to be left/right symmetric with reference to the seatback 10, respectively.

In addition, the seat airbag apparatus according to the present disclosure may further include: top side fabric tethers 310 coupled to connect the upper end of the seatback 10 and the side cushions 100, and when the side cushions 100 are deployed, configured to be spread in a flat surface having a predetermined size so as to restrict the deployment of the side cushions 100; top front fabric tethers 320 coupled to connect the upper end of the seatback 10 and the front cushions 200, and when the front cushions 200 are deployed, configured to be spread in a flat surface having a predetermined size so as to restrict the deployment of the front cushions 200; bottom side fabric tethers coupled to connect the lower end part of the seatback 10 and the side cushions 100, and when the side cushions 100 are deployed, in order to prevent filling of the side cushions 100 therefrom, configured to be spread in a flat surface having a predetermined size so as to restrict the deployment of the side cushions; and bottom front fabric tethers 330 coupled to connect the lower end part of the seatback 10 and the front cushions 200, and when the front cushions 200 are deployed, in order to prevent lifting of the front cushions 200, configured to be spread in a flat surface having a predetermined size so as to restrict the deployment of the front cushions.

The top side fabric tethers 310, the top front fabric tethers 320, the bottom side fabric tethers, and the bottom front fabric tethers 330 may be configured to be left/right symmetric with respect to the seatback 10, respectively.

The seat airbag apparatus according to the present disclosure may have a configuration in which the side cushions 100 protrude and deploy from the seatback 10, and the side cushions 100 are deployed first and then the front cushions 200 are continuously deployed from the side cushions 100 to be spread. Therefore, the seat can move and rotate, and thus particularly, there is an advantage in that the seat airbag apparatus can be suitably used in autonomous vehicles in which seating conditions of the passenger are various.

In addition, an exemplary embodiment according to the present disclosure may include tethers configured to restrict the deployment of the side cushions 100 and the front cushion 200, and the tethers may not be a general strap-shaped tether, but a fabric tether having a predetermined area. In particular, the tethers may have a configuration in which each of the upper end side and lower end side thereof is configured to have a double fabric tether structure so as to restrict the deployment of the side cushions 100 and the front cushions 200 by using strong restraining force thereof. Therefore, behaviors in the lateral direction, the forward direction, and the diagonal direction of the passenger may be effectively restricted. Accordingly, the protection of the passenger may be further effectively improved, and as a result, when an accident occurs, there is an advantage in that the injury value of the passenger can be reduced as much as possible.

Figure 2:
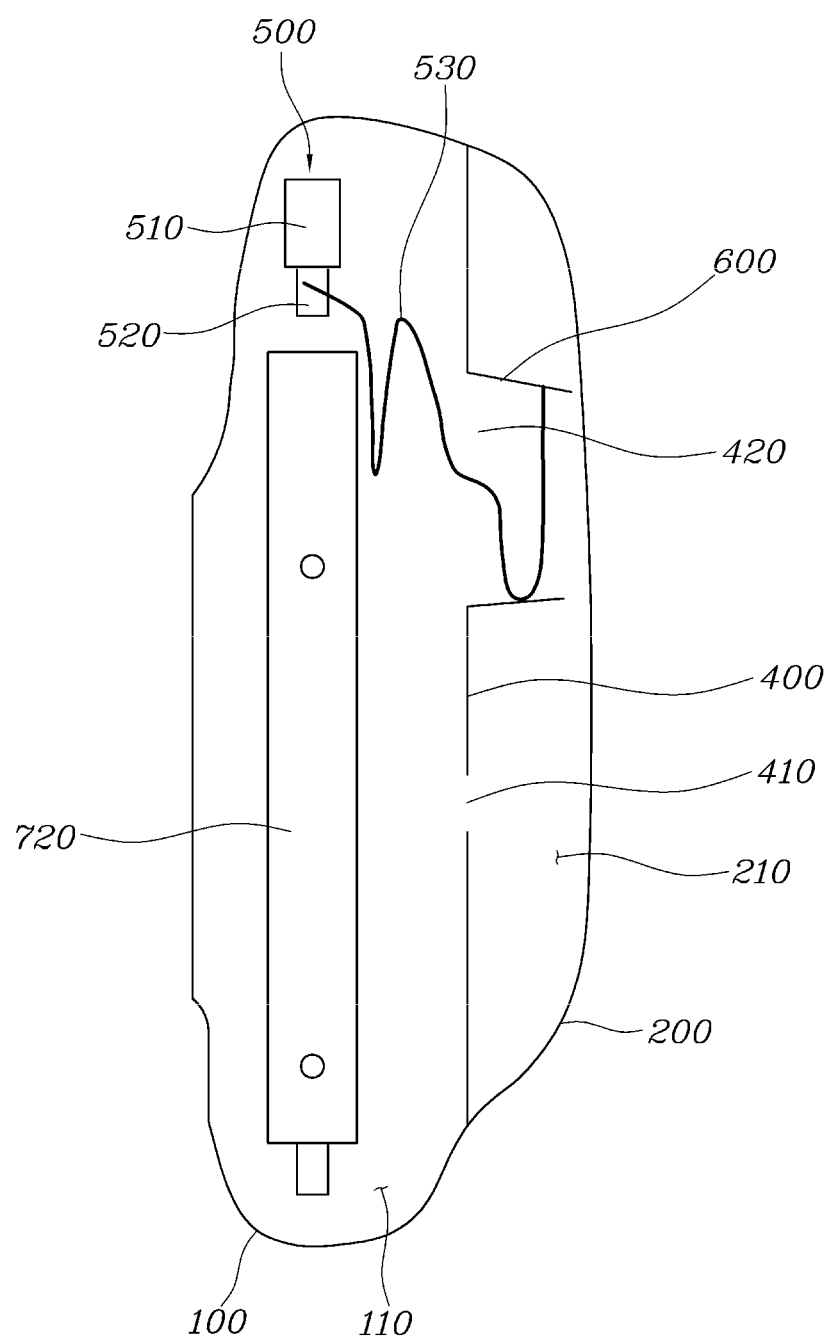
FIG. 2 is a view of a folded state in which side cushions and front cushions are undeployed, in a configuration including a diaphragm provided with an active vent hole and an active vent hole operating device according to the present disclosure.

As illustrated in FIG. 2, the seat airbag apparatus according to the present disclosure may include: a diaphragm 400 which is installed at each of portions to which the side cushions 100 and the front cushions 200 are respectively connected so as to separate side chambers 110 and front chambers 210, and includes a basic vent hole 410 configured to always connect the side chamber 110 and the front chamber 210 and an active vent hole 420 configured to connect or disconnect the side chamber 110 and the front chamber 210; and an active vent hole operating device 500 provided to be connected to the active vent hole 420 so as to open or close the active vent hole 420 depending on a collision situation.

According to the airbag device of the present disclosure, when a side collision accident occurs, the active vent hole 420 may be closed by the active vent hole operating device 500 to delay the deployment speed of the front cushions 200 and thus to enable the side cushions 100 so as to have sufficient internal pressure, thereby improving ability to respond to a side collision; and when a frontal collision accident occurs, the active vent hole 420 may maintain an open state to increase a supply speed of airbag gas supplied to the front cushions 200 so that the front cushions 200 can be rapidly deployed, thereby improving ability to respond to a frontal collision and as a result, further improving performance in protection of the passenger.

The diaphragm 400 according to the present disclosure may be made of a fabric material, and may be sewn and coupled to each of the portions to which the side cushions 100 and the front cushions 200 are respectively connected.

The diaphragm 400 may include the basic vent hole 410 having a predetermined size and the active vent hole 420 formed at a side part of the basic vent hole 410. One end of a cylindrical member 600 may be sewn and coupled to a portion at which the active vent hole 420 is formed, and the other end of the cylindrical member 600 may be provided to protrude toward the front chambers 210.

Accordingly, as the cylindrical member 600 is opened or closed, a configuration of the active vent hole 420, which allows the side chamber 110 and the front chamber 210 to be connected to or disconnected from each other, may be implemented.

The cylindrical member 600 may be made of the same fabric material as the diaphragm 400, and one end thereof may be sewn and coupled to the diaphragm 400.

The active vent hole operating device 500 according to the present disclosure may include: an actuator 510 fixed to a seatback frame 11 and configured to operate by an airbag control unit (ACU) 710; an actuating part 520 configured to be inserted into the actuator 510 or be broken, when the actuator 510 operates; and a tether 530 which has one end coupled to the cylindrical member 600 and the other end connected to the actuating part 520 after being wound along the circumference of the cylindrical member 600, the other end being configured to be separated from the actuating part 520 only when actuating part 520 operates.

Figure 3:
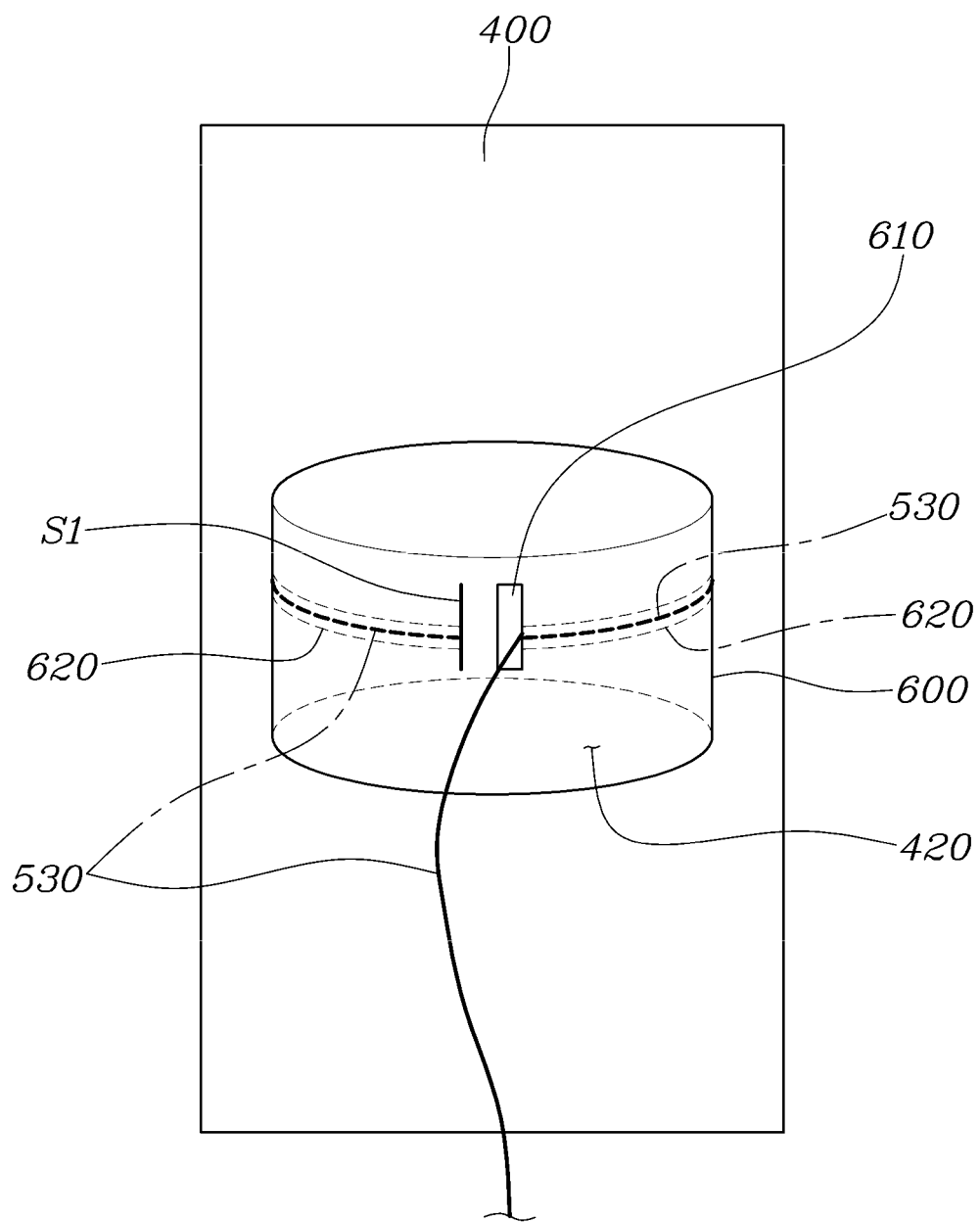
FIG. 3 is a view illustrating a cylindrical member and a tether according to the present disclosure.

As illustrated in FIG. 3, a slit hole 610 penetrating the inner side and the outer side of the cylindrical member 600 may be formed through the cylindrical member 600. One end of the tether 530 may be coupled to one side of the slit hole 610 by sewing S1, and the other end of the tether 530 may be installed to be connected to the actuating part 520 after being wound around the circumference of the cylindrical member 600 in a circular shape and then passing through the slit hole 610.

A tether insertion hole 620 may be formed through the inner surface, which has a cross-sectional thickness, of the cylindrical member 600 along the inner circumference of the cylindrical member 600, and the tether insertion hole 620 may be connected to the slit hole 610.

One end of the tether 530 may be inserted into the tether insertion hole 620 through the slit hole 610, and then may surround the circumference of the cylindrical member 600 along the tether insertion hole 620 in a circular shape, and the end thereof may be fixedly coupled to one side of the slit hole 610 by sewing S1.

Accordingly, when the tether 530 is pulled, the cylindrical member 600 may be tethered by the tether 530, and thus the active vent hole 420 may be closed.

The actuator 510 may be configured to have a configuration in which an operation thereof is controlled by the airbag control unit 710. The actuator 510 may be configured to have a configuration: which operates by the control of the airbag control unit 710 when a frontal collision accident occurs; and which does not operate by the control of the airbag control unit 710 when a side collision accident occurs.

When the actuator 510 operates, the actuating part 520 may operate, and the other end of the tether 530 may be disconnected from the actuating part 520 by the operation of the actuating part 520.

The airbag control unit 710 may be configured to control operation of an inflator 720 together with the actuator 510.

The inflator 720 may operate by the control of the airbag control unit 710 which receives signals from a front collision sensor 730 and a side collision sensor 740 mounted to the vehicle, airbag gas may be generated by the operation of the inflator 720, and the airbag gas may be supplied to the side chambers 110 and the front chambers 210 so as to deploy the side cushions 100 and the front cushions 200.

As illustrated in FIG. 3, in the case of a folded state in which both the side cushions 100 and the front cushions 200 are undeployed as the inflator 720 does not operate, both ends of the tether 530 may maintain a state of connecting the cylindrical member 600 and the actuating part 520 so that the active vent hole 420 maintains an open state.

Figure 4:
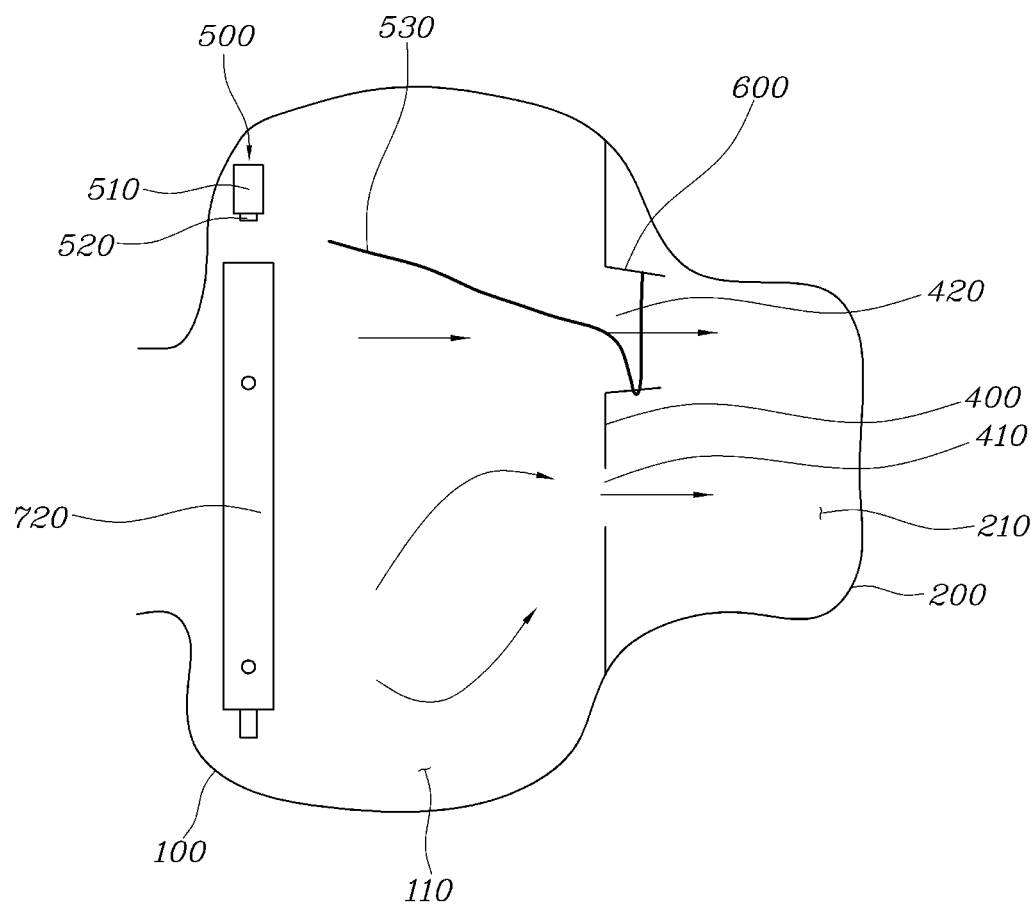
FIG. 4 to FIG. 5 are views illustrating operation states when a frontal collision accident and a side collision accident occur.

As illustrated in FIG. 4, when a frontal collision accident occurs, the inflator 720 and the actuator 510 may operate together by the control of the airbag control unit 710; the tether 530 may be separated from the actuating part 520 by the operation of the actuating part 520 by the operation of the actuator 510; and when the tether 530 is separated from the actuating part 520, the active vent hole 420 may maintain an open state, and the airbag gas generated by the inflator 720 may be simultaneously supplied from the side chamber 110 to the front chamber 210 through the basic vent hole 410 and the active vent hole 420.

That is, when a frontal collision accident occurs, the active vent hole 420 may maintain an open state, the side cushions 100 may be deployed by the airbag gas, and the airbag gas of the side chamber 110 may be simultaneously supplied to the front chamber 210 through the basic vent hole 410 and the active vent hole 420. Therefore, the front cushions 200 may be rapidly deployed to improve ability to respond to a frontal collision and as a result, to further improve performance in protection of the passenger.

Figure 5:
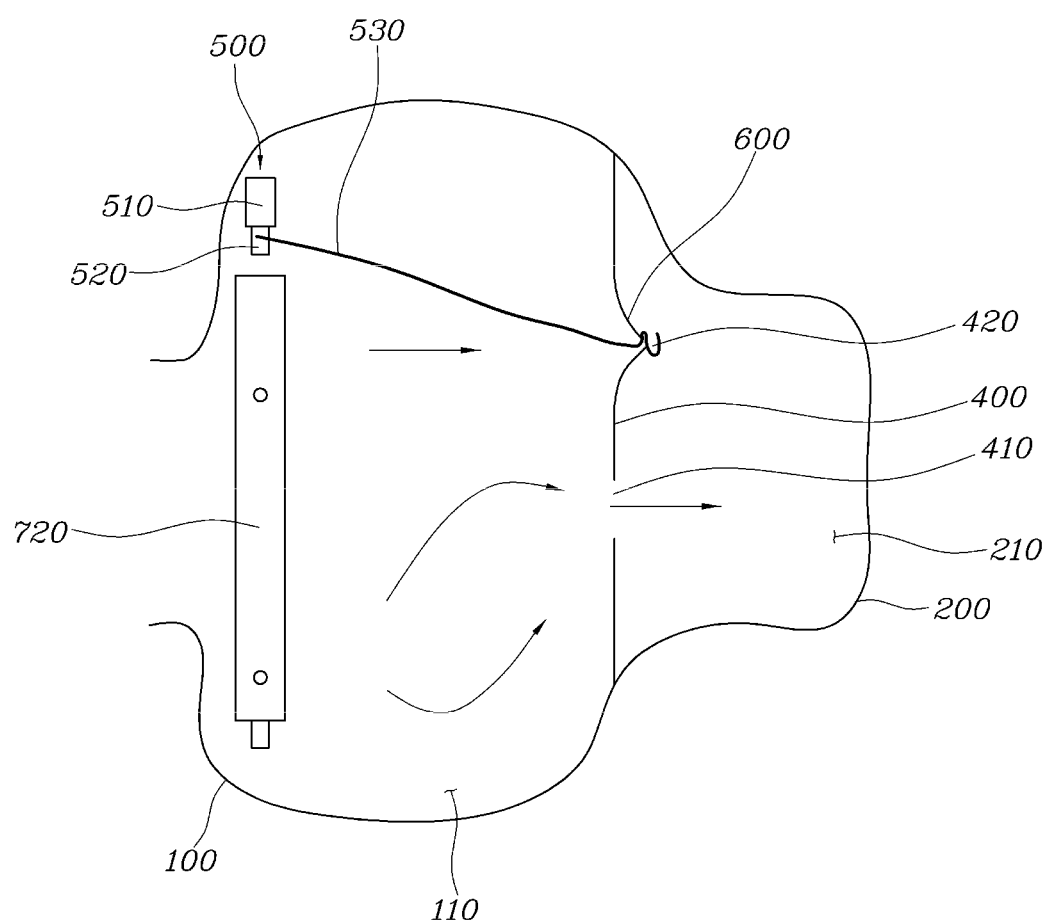

As illustrated in FIG. 5, when a side collision accident occurs, the inflator 720 may operate by the control of the airbag control unit 710 but the actuator 510 may not operate, and the side cushions may be 100 deployed by the airbag gas generated by the inflator 720; and when the side cushion 100 is deployed, the tether 530 may be pulled toward the actuating part 520, and the cylindrical member 600 may be tied by the tether 530 by the pulling of the tether 530. Therefore, the active vent hole 420 may be closed, and the airbag gas may be supplied from the side chamber 110 to the front chamber 210 only through the basic vent hole 410.

That is, when a side collision accident occurs, by the pulling of the tether 530 by the operation of the active vent hole operating device 500, the cylindrical member 600 may be tethered by the tether 530 to close the active vent hole 420, and by the closing of the active vent hole 420, the airbag gas may be supplied from the side chamber 110 to the front chamber 210 only through the basic vent hole 410. Therefore, the side cushions 100 may have sufficient internal pressure as the deployment speed of the front cushions 200 is delayed, thereby improving ability to respond to a side collision and as a result, further improving performance in protection of the passenger.

Figure 6:
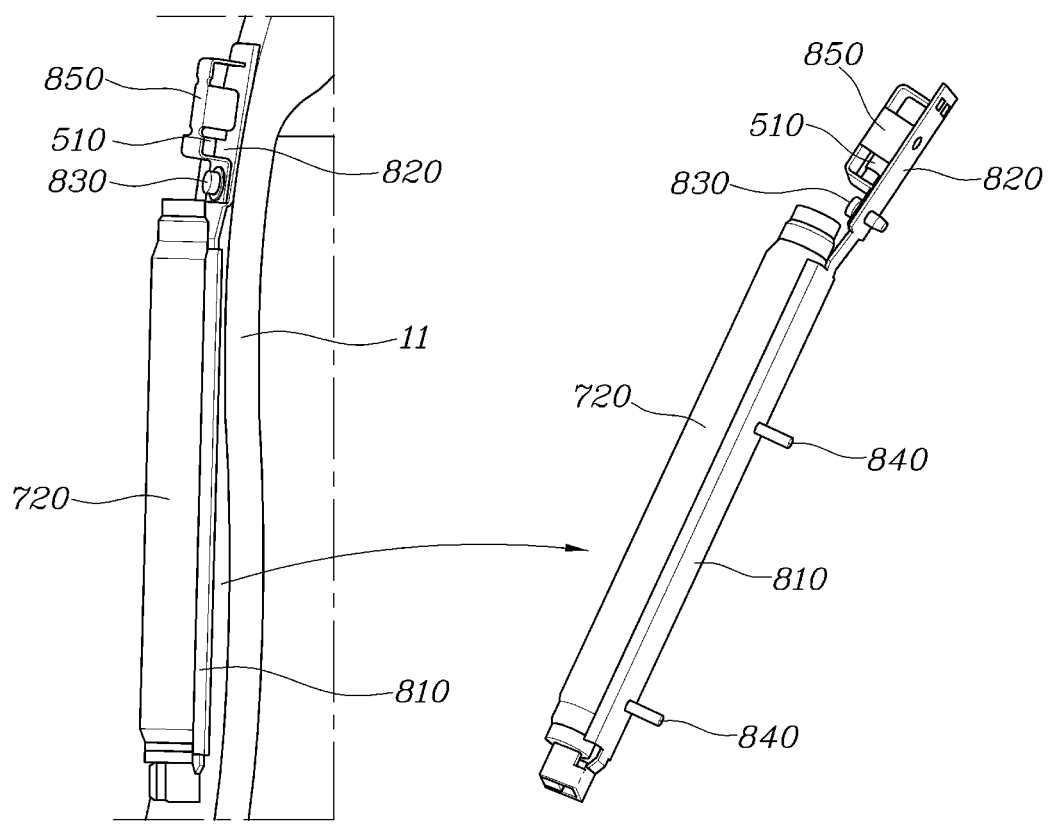
FIG. 6 is a view illustrating an installation structure of an actuator and an inflator according to the present disclosure.
Figure 7:
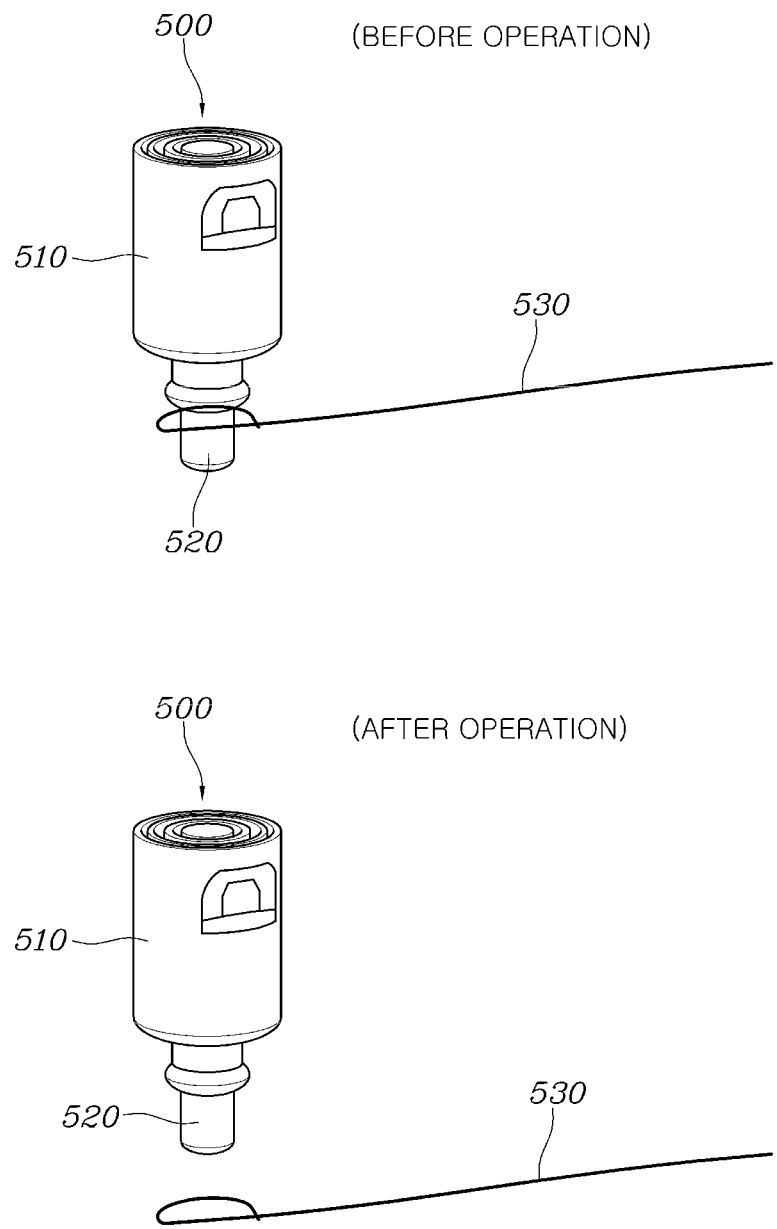
FIG. 7 is a view illustrating an actuator before and after an operation thereof.
Figure 8:
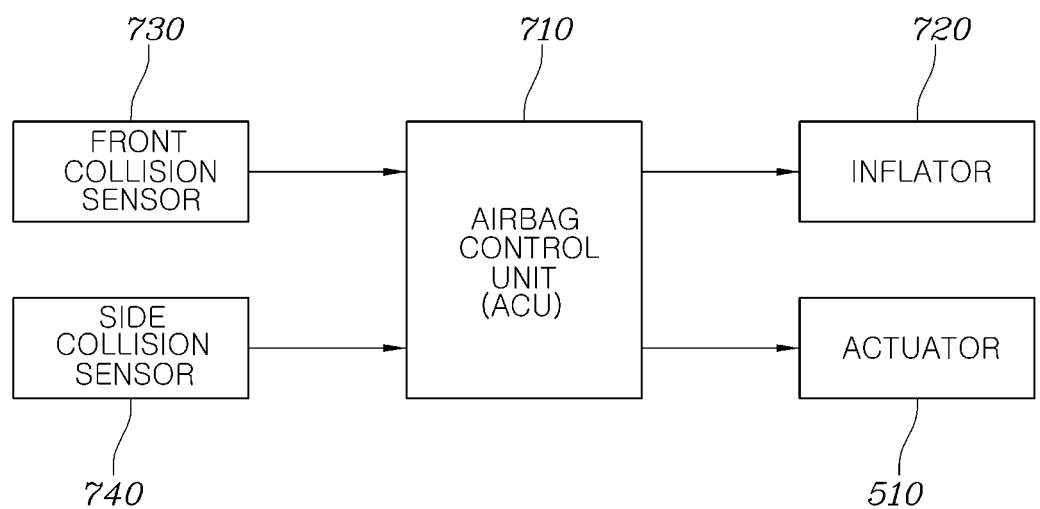
FIG. 8 is a schematic block diagram illustrating a configuration in which operations of an inflator and an actuator are controlled by an airbag control unit according to the present disclosure.

As illustrated in FIG. 6, the inflator 720 may be fixed to an inflator bracket 810, the actuator 510 may be fixed to an actuator bracket 820, the inflator bracket 810 and the actuator bracket 820 may be connected to each other by a bolt 830, and the inflator bracket 810 may be coupled to the seatback frame 11 by means of multiple studs 840 and thus may be installed in a fixed structure.

Reference numeral 850 of FIG. 6 denotes an actuator cover.

An exemplary embodiment according to the present disclosure enables ability to respond to a frontal collision or ability to respond to a side collision to be improved through adjustment of the size of the basic vent hole 410 and the size of the active vent hole 420.

That is, the basic vent hole 410 may be configured to have a size larger than the active vent hole 420 so as to increase the deployment speed of the front cushions 100, thereby improving ability to respond to a frontal collision. On the contrary, the active vent hole 420 may be configured to have a size larger than the basic vent hole 410 so that the front cushions 100 can maintain an increased internal pressure through a delay of the deployment speed of the side cushions 100, thereby improving ability to respond to a side collision.

In addition, according to an exemplary embodiment of the present disclosure, a protection area, in which the passenger 20 is protected by the side cushions 100, may be adjusted according to positions of the basic vent hole 410 and the active vent hole 420.

That is, the protection area, in which the passenger 20 is protected by the side cushions 100, may include a head area, a chest area, an abdomen area, and a pelvis area of the passenger. When the active vent hole 420 is positioned higher than the basic vent hole 410, a function for protection of the head of the passenger 20 by the side cushions 100 may be enhanced. On the contrary, when the active vent hole 420 is positioned lower than the basic vent hole 410, a function for protection of the pelvis of the passenger 20 by the side cushions 100 may be enhanced.

As described above, the vehicle seat airbag apparatus according to an exemplary embodiment of the present disclosure may include the side cushions 100 deployed forward from the seatback 10 and the front cushions 200 deployed from the side cushions 100 to the front of the passenger 20, and may have a configuration in which the diaphragm 400 having an active vent structure is installed each between the side cushions 100 and the front cushions 200. Therefore, when a side collision accident occurs, the active vent hole 420 may be closed by the active vent hole operating device 500 so as to delay the deployment speed of the front cushions 200 and thus enable the side cushions 100 to maintain sufficient internal pressure, thereby improving ability to respond to a side collision. In addition, when a frontal collision accident occurs, the active vent hole 420 may maintain an open state to increase the supply speed in which the airbag gas is supplied to the front cushions 200 and thus to rapidly deploy the front cushions 200, thereby improving ability to respond to a frontal collision. As a result, there is an advantage of further improving performance in protection of a passenger.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vehicle seat airbag apparatus comprising:
   a side cushion configured to protrude and deploy forward from a seatback and positioned at each of the side surfaces of a passenger;
   a front cushion configured to protrude and deploy from the side cushion to the front of the passenger;

a diaphragm which is installed at a portion to which the side cushion and the front cushion are connected so as to separate a side chamber and a front chamber, and comprises a basic vent hole configured to always connect the side chamber and the front chamber, and an active vent hole configured to connect or disconnect the side chamber and the front chamber; and an active vent hole operating device provided to be connected to the active vent hole and configured to open or close the active vent hole depending on a collision situation, wherein a protection area, in which the passenger is protected by the side cushion, comprises the head, the chest, the abdomen, and the pelvis area of the passenger;

wherein, when the active vent hole is positioned higher than the basic vent hole, a function for protection of the head of the passenger by the side cushion is enhanced; and wherein, when the active vent hole is positioned lower than the basic vent hole, a function for protection of the pelvis of the passenger by the side cushion is enhanced.

2. The vehicle seat airbag apparatus of claim 1, wherein the diaphragm is made of a fabric material and sewn and coupled to the portion to which the side cushion and the front cushion are connected.

3. The vehicle seat airbag apparatus of claim 1, wherein:
a cylindrical member is coupled to protrude from the diaphragm toward the front chamber; and
the active vent hole is configured such that, as the cylindrical member is opened or closed, the side chamber and the front chamber are connected to or disconnected from each other.

4. The vehicle seat airbag apparatus of claim 3, wherein the cylindrical member is made of a fabric material, and one end thereof is sewn and coupled to the diaphragm.

5. The vehicle seat airbag apparatus of claim 3, wherein the active vent hole operating device comprises:
an actuator fixed to a seatback frame and operated by an airbag control unit;
an actuating part inserted into the actuator or broken when the actuator operates; and
a tether having one end coupled to the cylindrical member and the other end connected to the actuating part after being wound along the circumference of the cylindrical member, the other end being separated from the actuating part only when the actuating part operates.

6. The vehicle seat airbag apparatus of claim 5, wherein:
a slit hole penetrating the inner and the outer side of the cylindrical member is formed through the cylindrical member;
the one end of the tether is sewn and coupled to one side of the slit hole; and
the other end of the tether is installed to be connected to the actuating part after surrounding the circumference of the cylindrical member in a circular shape and then passing through the slit hole.

7. The vehicle seat airbag apparatus of claim 5, wherein: when a frontal collision accident occurs, the actuator is configured to operate by control of the airbag control unit; and when a side collision accident occurs, the actuator is configured not to operate by control of the airbag control unit.

8. The vehicle seat airbag apparatus of claim 5, wherein the actuator is covered by an actuator cover.

9. The vehicle seat airbag apparatus of claim 5, wherein the actuator is fixed to the seatback frame by multiple studs.

10. The vehicle seat airbag apparatus of claim 5, further comprising
an inflator configured to operate by control of the airbag control unit which has received signals from a front collision sensor and a side collision sensor installed in the vehicle so as to generate airbag gas.

11. The vehicle seat airbag apparatus of claim 10, wherein
in a folded state where both the side cushion and the front cushion are undeployed as the inflator does not operate, the tether is configured to maintain a state where both ends thereof are connected to the cylindrical member and the actuating part, and the active vent hole is configured to maintain an open state.

12. The vehicle seat airbag apparatus of claim 10, wherein:
when a frontal collision accident occurs, the inflator and the actuator are configured to operate together by control of the airbag control unit; and when the actuating part operates by an operation of the actuator, the active vent hole is configured to maintain an open state as the tether is separated from the actuating part, and the airbag gas generated by the inflator is supplied from the side chamber to the front chamber through the basic vent hole and the active vent hole.

13. The vehicle seat airbag apparatus of claim 10, wherein:
when a side collision accident occurs, by control of the airbag control unit, the inflator operates and the actuator does not operate, and the side cushion is deployed by the airbag gas generated by the inflator; and when the side cushion is deployed, the tether is pulled toward the actuating part, and the cylindrical member is tethered by the tether by the pulling of the tether so that the active vent hole is closed and the airbag gas is supplied from the side chamber to the front chamber only through the basic vent hole.

14. The vehicle seat airbag apparatus of claim 10, wherein:
the inflator is fixed to an inflator bracket;
the actuator is fixed to an actuator bracket;
the inflator bracket and the actuator bracket are connected to each other; and
the inflator bracket is coupled to the seatback frame to allow same to be fixed thereto.

15. The vehicle seat airbag apparatus of claim 10, wherein:
the basic vent hole is configured to have a size larger than the active vent hole so as to increase the deployment speed of the front cushion, thereby improving ability to respond to a frontal collision; and
the active vent hole is configured to have a size larger than the basic vent hole so as to allow the side cushion to maintain an increased internal pressure through a delay of the deployment speed of the front cushion, thereby improving ability to respond to a side collision.

16. A vehicle comprising the vehicle seat airbag apparatus of claim 1.

* * * * *